June 9, 1964 A. D. COPE 3,136,909

STORAGE DEVICE HAVING A PHOTOCONDUCTIVE TARGET

Filed July 10, 1959

INVENTOR.
APPLETON D. COPE
BY C. Lance Marshall, Jr.
ATTORNEY

United States Patent Office 3,136,909

Patented June 9, 1964

3,136,909
STORAGE DEVICE HAVING A PHOTOCONDUCTIVE TARGET

Appleton Danforth Cope, Hightstown, N.J., assignor to Radio Corporation of America, a corporation of Delaware Filed July 10, 1959, Ser. No. 826,289
3 Claims. (Cl. 313—65)

This invention relates to devices for storing electrostatic charges representative of an optical image. In particular, this invention relates to photoconductive type devices for storing electrostatic charges.

In the prior art, there are many known types of storage tubes which are capable of receiving an electrical pattern and storing, or retaining, this pattern for a long period of time, and then providing an electrical output signal corresponding to the stored pattern. There are also devices in the prior art which receive an optical pattern, store this pattern for any desired length of time, and then reproduce this pattern as a visible output image.

This invention differs from these previously described devices in that this invention is directed to a storage device which receives an optical image, converts and stores this image as an electrostatic charge for any desired length of time, and reads out the image as an electrical output signal.

One type of tube which receives an optical image, stores an electrostatic image for a short period of time, and then reads out the stored image, is a pickup tube of the photoconductive type. The tubes of this type generally utilize a target in which a photoconductor is disposed on a transparent signal plate. These tubes are normally used as television camera tubes and, when used in this manner, the photoconductive target accumulates or stores a charge throughout the period of time, say $\frac{1}{30}$ of a second, between interrogations by the scanning electron beam. By selecting some of the more insulating type photoconductors for use in such a target, charges accumulated by exposure of the photoconductor to an image can be usefully stored for periods of time considerably longer than $\frac{1}{30}$ of a second before the beam reads out the charges. The length of storage time available before the image deteriorates varies, within limits, with the resistance characteristics of the selected photoconductor. Some of the more insulating photoconductive materials are capable of storing a charge pattern for periods of the order of one-half hour before serious image deterioration occurs.

In certain applications, electrical storage of an optical input image for considerably longer periods of time is necessary. One such application is found in the scientific rocket field wherein it is desired to optically observe other planets, then return the rocket to transmitting ranges of the earth, before the signal is read out and transmitted to receivers positioned on earth. In the rocket field, the problems of various other radiations affecting either the light sensitive properties, or the charge storage properties, of any material selected must be considered. The reason for this is that the pickup and storage device must pass through concentrated radiation bands encircling the earth both before and after the image is stored in order for the device to complete its function.

There are available certain pickup-storage systems in the prior art which include a camera tube sensitive to an optical image. The output of the camera tube is then applied to a magnetic tape or a storage tube for storage purposes. These systems have the disadvantage that the original image must be re-imaged into the storage device, thus losing considerable definition of the stored picture.

It is, therefore, an object of this invention to provide a novel combination pickup-storage device for the electrostatic storage of an optical signal.

It is a further object of this invention to provide an optically excited electrostatic storage device which is capable of retaining an image for an indefinite period of time.

It is a still further object of this invention to provide a storage device which is substantially unaffected by radiations other than those which are used to operate the device.

These and other objects are accomplished in accordance with this invention by providing a device including a signal plate, a photoconductor, and an insulator, which are in layers in the order recited, with a means for producing an electrical charge pattern, corresponding to an optical image, between the signal plate and the exposed surface of the insulator. By proper selection of the materials and geometry for the photoconductor-insulator sandwich, this charge pattern may be stored for any desired length of time, and may be read out in the form of an electrical signal.

The invention will be more clearly understood by reference to the following description when read in conjunction with the accompanying single sheet of drawings wherein.

Figure 1:
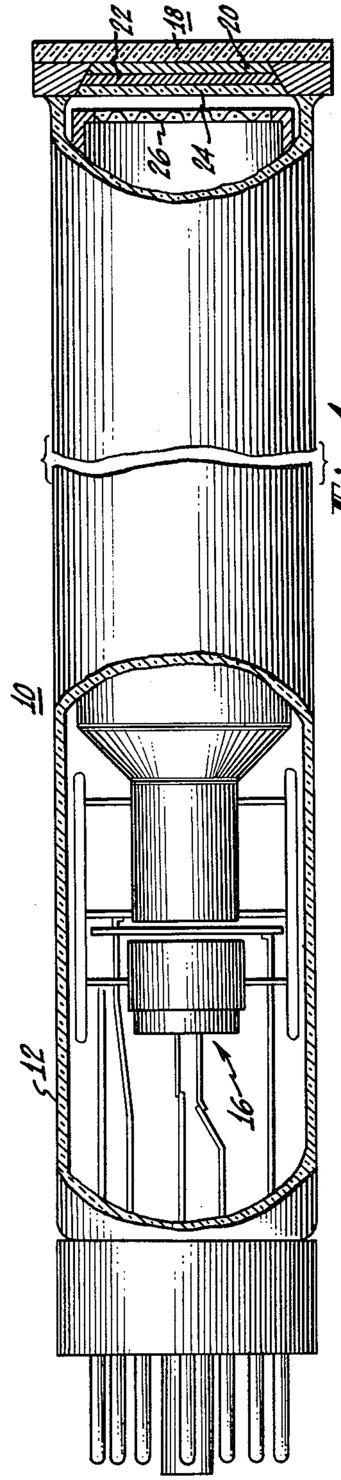
FIG. 1 is a longitudinal and partly sectional view of a device in accordance with this invention.

Reference is now made to FIG. 1, which shows a camera type storage device 10 in accordance with this invention. The device 10 comprises an evacuated envelope 12 having an electron gun 16 in one end thereof. The electron gun 16 may be any of the known types of electron guns and produces an electron beam directed toward a target electrode 18 in the other end of the envelope 12. The electron beam is focused and scanned over the exposed surface of the target electrode by any conventional means (not shown).

The target electrode 18, comprises a transparent electrical conductor 20 having a layer of photoconductive material 22 thereon. The photoconductor 22 is in turn covered by a layer of insulating material 24. The device 10 is similar to a "Vidicon" type camera tube except for the provision of the insulation layer 24 and the selection and geometry of the material used as the photoconductor 22. The photoconductor 22, in accordance with this invention, is selected for its resistive characteristics and its sensitivity, rather than the lack of photoconductive lag which is one of the major factors in selecting materials for a commercial television camera tube.

The transparent conducting signal plate 20 may be made of tin oxide or a thin evaporated metal film such as gold. The signal plate 20 may be deposited by any known technique such as spraying or evaporation. The signal plate 20 should be highly electrically conductive and should be transparent to the particular radiant energy for which the device 10 is designed to respond.

The photoconductor 22 is made of any one of many known materials, or mixtures thereof, which changes its resistance in response to radiant energy directed thereon. When the device 10 is designed so as to be sensitive to a particular wavelength of radiant energy, e.g. visible light or infrared energy, the photoconductor is selected so that its sensitivity to the selected wavelength is high. For the visible light range amorphous antimony tri-sulphide has been found suitable. For infrared radiations a combination of PbS and PbO is suitable, while for ultraviolet radiations either amorphous Se or PbO are suitable. The photoconductor 22 may be deposited by evaporation for example.

The insulating layer 24 may be any known electrical insulator. The particular material selected, and its thickness, are determined by the resistance of the material and by the length of time during which the image is to be stored. In short, the geometry of the material is selected so that the dielectric relaxation time (RC time constant) is substantially greater than the storage time desired. The insulating layer 24 and the photoconductor 22 are selected so that the combination, or the target 18, will have a resistivity that is greater than $10^{15}$ ohm-cm. As an example, with a photoconductive layer 22 of 5 microns of antimony tri-sulphide, a suitable insulaing layer would be a layer of mica 5 microns thick. This type of target has been found to produce storage, without serious picture deterioration, for as long as several hours. For longer storage periods, e.g. 24 hours, higher resistance insulating layers are chosen, e.g. polystyrene of other organic insulators, and/or thicker layers are deposited. In general, the resistivity of the target is determined by the resistivity of the insulator which in turn determines the storage time. The resistivity of the photoconducor is to be considered only in that this resistivity should be high enough so that, for scene areas less than the maximum brightness, the photoconductor does not become completely discharged during the exposure time.

The insulating layer 24 may be deposited by well known techniques such as spraying settling, evaporation, or sputtering. In the alternative, the insulating layer 24 may form the support for the target and have the other materials deposited thereon.

Figure 2:
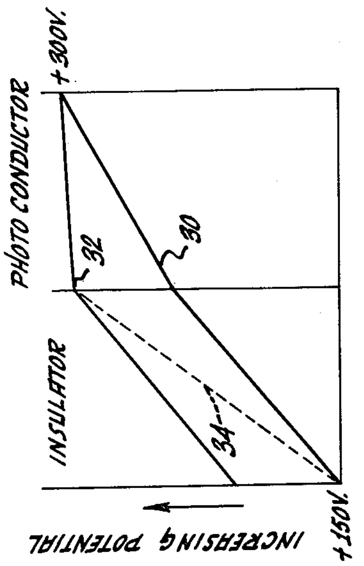
FIG. 2 is a schematic representation of the operation of the target shown in FIG. 1; and, FIG. 3 is a partially schematic view of another embodiment of this invention.

The operation of the device 10, with reference to FIG. 2 is as follows. With no light on the target electrode, and with the potentials shown in FIG. 2 applied to the tube, the electron beam scans the exposed surface of the insulating material 24 and drives the scanned surface of the insulating layer 24 to the potential of the collector mesh 26 (150 volts). Now, with the electron beam and the optical image off, the potential of the signal plate 20 is raised, e.g. to 300 volts. Under these conditions, the potential distribution across the sandwich of the insulator and photoconductor is in accordance with the relative resistances of the two layers. This is represented by curve 30 of FIG. 2. The target 18 is now prepared for the storage of an image. With the electron beam still off, and when a light or optical image is directed onto the photoconductor, the resistance of elemental areas of the photoconductor is reduced in proportion to the amount and shade of image focused onto these areas of the photoconductor. Thus, the potential drop across the illuminated area of the photoconductor is now substantially reduced by current flow through the photoconductor. With the signal plate potential fixed, the potential of the interface between photoconductor and insulator rises by an amount depending on the light-induced conductivity. The potential across the insulator is not changed. However, due to the thinness of the insulator 24, and by capacitive coupling across the insulator, the front surface of the insulator is also raised in potential by an amount equal to the rise in potential of the interface to point 32.

If now the electron beam is turned on, the electron beam returns the scanned surface of the insulator to collector potential (150 volts) so that a potential distribution across the insulator 24 is developed which is represented by curve 34. The curve 34 indicates the condition of a high order of brightness of the scene during the exposure time. For scenes having less brightness, the slope of the line 34 is less. If the beam is now turned off and the light is turned off, the charge pattern existing on both sides of the insulating layer 24 will remain indefinitely. The factor which controls the period of time during which the charge will be stored is the insulating property or the dielectric relaxation time of the insulator. As is well known, certain insulators are highly insulating and thus, a charge image may be retained for periods of days, as in accordance with this invention, the total target resistivity is greater than $10^{15}$ ohm-cm.

To read out the charge image, the signal plate side of the insulating layer 24 is brought to a uniform potential, i.e. 150 v. This may be done by connecting the signal plate 20 to the equilibrium potential either by allowing sufficient time for dark leakage through the photoconductor, or by shining a uniform light on the photoconductor. When operating for long storage times, e.g. one hour or more, and when the dark current flow through the photoconductor having a resistivity of less than $10^{10}$ ohm-cm., the leakage method is preferred since it is automatic. For photoconductors having a high resistivity, or for short storage periods, a blanking light should be directed onto the photoconductor to bring the signal plate side of the insulator to the equilibrium potential. After either of these methods is used to bring the interface to a fixed potential, the pattern of charge will appear on the exposed face of the insulator. Areas of the insulator over a signal exposed area of photoconductor are more negative, on the scanned face of the insulator, than the unexposed or dark elemental areas of the insulator. Under these conditions, and with the signal plate still connected to the equilibrium potential, the electron beam, when scanned over the target, restores the scanned surface of the insulator 24 to the equilibrium potential and, in so doing, generates a signal in the signal plate by capacitive coupling. The signal generated is negative in polarity as compared to the signal developed in standard "Vidicon" type operation. The stored charge is removed by the first few scans of the beam; then no further signal is available until the exposure cycle is repeated. The reading out of the stored charge primes or readies the device for the next storage cycle.

The above described operation is for high electron beam velocity where the electron beam lands at velocities that are above the first cross-over point of the secondary emission characteristic for the insulator 24. It should be clearly understood that the complete operation can be performed with a low velocity scan using lower signal plate potentials so that the beam stabilizes the scanned face of the insulator 24 at an equilibrium potential that is substantially the potential of the cathode of the electron gun.

Figure 3:
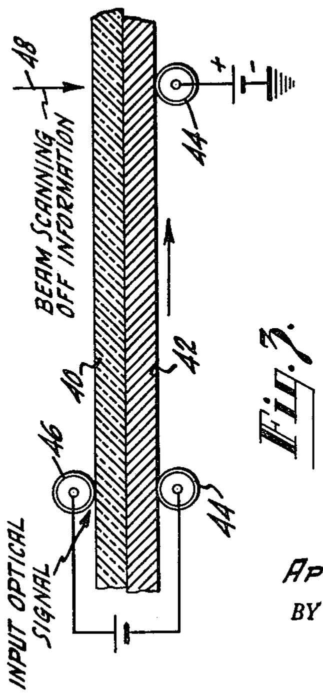

Referring now to FIG. 3 there is shown an embodiment of this invention which is designed for the storage of large quantities of information. The device shown in FIG. 3 comprises a ribbon or tape of the photoconductor-insulator sandwich including a layer of insulating material 40 and also a layer of photoconductive material 42. The materials described in connection with FIG. 1 may also be used in the device of FIG. 3 except that the photoconductor-insulator sandwich should be strong enough to be self-supporting and flexible enough to be capable of being rolled.

The photoconductor-insulator sandwich or tape is supported so that it is movable across a group of opposed roller contacts 44 and 46. The movement may be produced by the rotation of storage reels (not shown) for storing the tape both before and after the input information is stored thereon.

During the storage operation, as the photoconductor-insulator sandwich or tape is moved across the roller contacts, the roller-contact 44 functions as the signal plate in the embodiment shown in FIG. 1 while the upper roller-contact 46 functions as the electron beam of FIG. 1 for the storage or charging of the sandwich. It should be understood that an electron beam could be substituted for the upper contact 46. The electron beam 48 functions as the electron beam of FIG. 1 for the read out of a two dimensional image. The electron beam 48 could be replaced with a roller-contact for single line or single track read out of information.

The device shown in FIG. 3 may be enclosed in an evacuated container (not shown in FIG. 3) if electron beams are to be used and if the device is to operate on earth. Even if an electron beam is to be used, when the device is to be used for scientific rocket investigation purposes, no evacuated container is necessary because of the lack of atmosphere at the operating points or altitude. With only roller-contacts, and earth operation, no evacuated container is necessary.

Devices in accordance with this invention have been exposed to many radiations such as gamma rays, etc., both before and after charge storage has occurred, and have been found to operate as designed. Thus, both embodiments of this invention are believed to be useful particularly for scientific rocket investigation of remote planets.

What is claimed is:

1. A target for a storage device comprising a layer of insulating material in physical contact with a layer of photoconductive material, said layers of material having a resistivity of at least $10^{15}$ ohm-cm., and electrical means for scanning an exposed surface of said insulator.

2. A storage device comprising an evacuated envelope, an electron gun in one end of said envelope for producing an electron beam along a path, a target within the other end of said envelope and in said path, said target comprising a transparent conductor, a photoconductor on said transparent conductor, and an insulator on said photoconductor, said insulator being exposed to said electron beam, and said target having a resistivity of at least $10^{15}$ ohm-cm.

3. A storage device comprising a target, said target comprising a layer of photoconductive material, a layer of insulating material on said layer of photoconductive material, and an electron gun for scanning an exposed surface of said layer of insulating material opposite the surface contacting said layer of photoconductive material with an electron beam, the resistivity of said target being at least $10^{15}$ ohm-cm.

References Cited in the file of this patent

UNITED STATES PATENTS

| | | |
|---|---|---|
| 2,588,292 | Rittner et al. | Mar. 4, 1952 |
| 2,603,757 | Sheldon | July 15, 1952 |
| 2,622,219 | Schagen | Dec. 16, 1952 |
| 2,687,484 | Weimer | Aug. 24, 1954 |
| 2,777,040 | Kazan | Jan. 8, 1957 |
| 2,843,773 | Wardley | July 15, 1958 |
| 2,856,533 | Rosenthal | Oct. 14, 1958 |
| 2,900,569 | Cope | Aug. 18, 1959 |
| 2,901,348 | Dessauer et al. | Aug. 25, 1959 |
| 2,922,883 | Giaimo | Jan. 26, 1960 |
| 2,945,973 | Anderson | July 19, 1960 |
| 2,946,682 | Lauriello | July 26, 1960 |

FOREIGN PATENTS

| | | |
|---|---|---|
| 763,745 | Great Britain | Dec. 19, 1956 |